United States Patent
Halberstadt et al.

(10) Patent No.: US 7,239,118 B2
(45) Date of Patent: Jul. 3, 2007

(54) DC REGULATOR WITH PULSE PERIOD MODULATION

(75) Inventors: Johan Christiaan Halberstadt, Nijmegen (NL); Peter Theodorus Johannes Degen, Nijmegen (NL); Antonius Maria Gerardus Mobers, Nijmegen (NL)

(73) Assignee: NXP B.V., Eindhoven (NL)

( * ) Notice: Subject to any disclaimer, the term of this patent is extended or adjusted under 35 U.S.C. 154(b) by 230 days.

(21) Appl. No.: 10/518,826

(22) PCT Filed: Jun. 12, 2003

(86) PCT No.: PCT/IB03/02731

§ 371 (c)(1),
(2), (4) Date: Dec. 21, 2004

(87) PCT Pub. No.: WO2004/004104

PCT Pub. Date: Jan. 8, 2004

(65) Prior Publication Data

US 2005/0258812 A1 Nov. 24, 2005

(30) Foreign Application Priority Data

Jun. 27, 2002 (EP) .............................. 02077553.2
Dec. 5, 2002 (EP) .............................. 02080112.2

(51) Int. Cl.
*G05F 1/40* (2006.01)
(52) U.S. Cl. ...................................... 323/284; 323/224

(58) Field of Classification Search ................. 323/284, 323/283, 224, 282, 287, 299
See application file for complete search history.

(56) References Cited

U.S. PATENT DOCUMENTS

| | | | | |
|---|---|---|---|---|
| 4,524,412 A | 6/1985 | Eng | ............................. | 363/56 |
| 5,463,306 A | 10/1995 | Berry et al. | ................. | 323/222 |
| 5,479,090 A | 12/1995 | Schultz | ........................ | 323/284 |
| 5,568,044 A * | 10/1996 | Bittner | ........................ | 323/272 |
| 5,747,976 A | 5/1998 | Wong et al. | ................. | 333/282 |
| 5,801,518 A | 9/1998 | Ozaki et al. | ................. | 323/222 |
| 5,808,455 A * | 9/1998 | Schwartz et al. | ........... | 323/271 |
| 5,856,739 A | 1/1999 | Trica | ........................... | 323/222 |
| 5,932,996 A | 8/1999 | Liepe et al. | ................. | 323/284 |
| 6,366,070 B1 | 4/2002 | Cooke et al. | ............... | 323/284 |
| 6,678,178 B2 * | 1/2004 | Lipcsei | ........................ | 363/98 |
| 6,940,189 B2 * | 9/2005 | Gizara | ........................ | 307/151 |

* cited by examiner

*Primary Examiner*—Shawn Riley
(74) *Attorney, Agent, or Firm*—Peter Zawilski

(57) ABSTRACT

A DC-DC converter includes a switch (S1) which periodically connects an inductor (L) to a DC-input voltage (Vi) during an on-period (Ton) of a period time (Tp). The operating frequency (fo) of the DC-DC converter is the inverse of the period time (Tp). An output (O1) of the DC-DC converter is coupled to the inductor (L) to supply an output voltage (Vo). A controller (CO) controls the operating frequency (fo) of the DC-DC converter to be substantially proportional to the output voltage (Vo) to obtain a substantially constant average duration of the on-period (Ton) as function of the output voltage (Vo).

14 Claims, 3 Drawing Sheets

Figure 1:
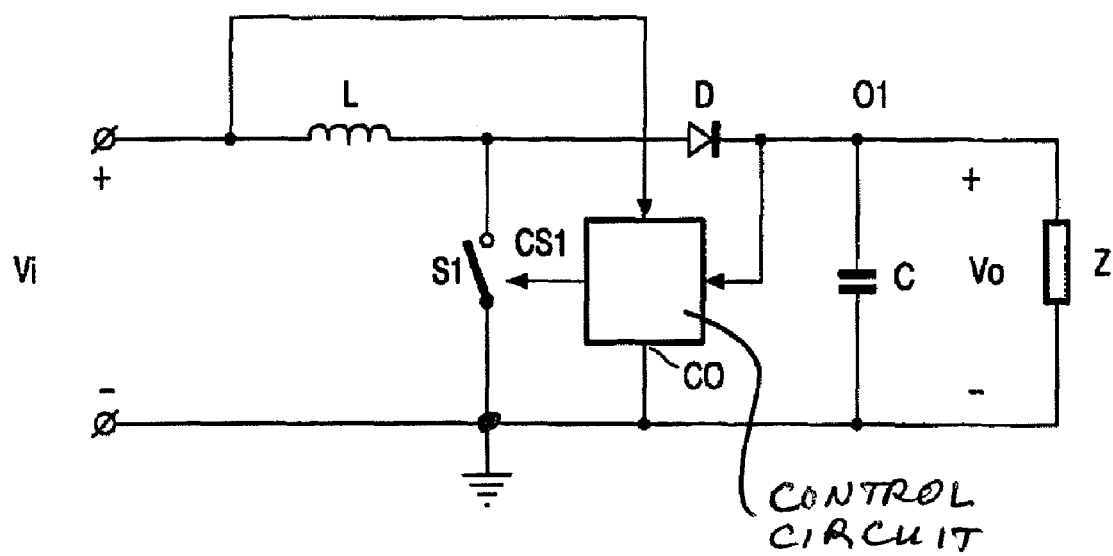

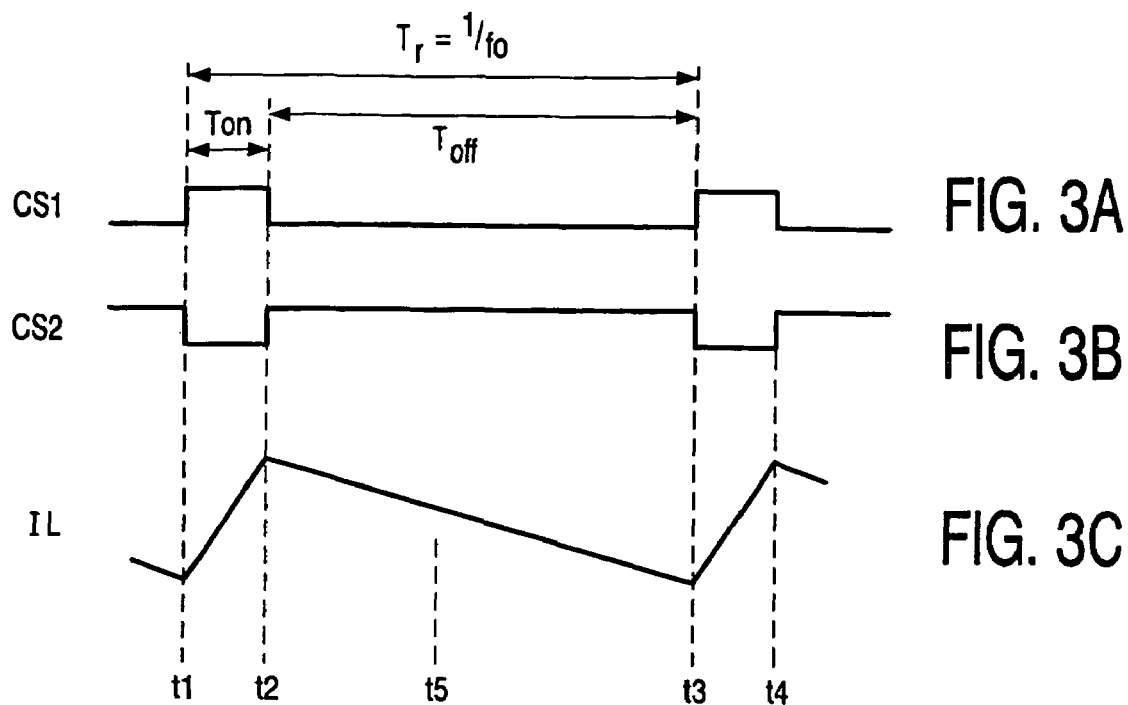
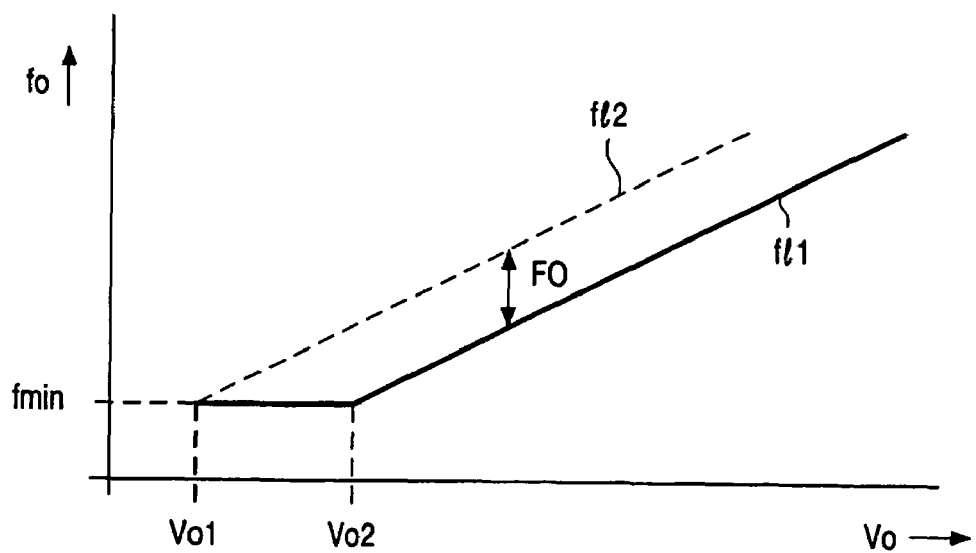
FIG. 4

DC REGULATOR WITH PULSE PERIOD MODULATION

The invention relates to a DC-DC converter, a controller for use in the DC-DC converter, an apparatus comprising the DC-DC converter, and a method of controlling the DC-DC converter.

U.S. Pat. No. 6,366,070 discloses a switching voltage regulator which employs a dual modulation scheme to control the regulator's switching components. A control circuit indirectly monitors the load current. When the load decreases, the control circuit reduces both the duty ratio and the frequency of the control signals which operate the switching transistors, thereby maintaining a high efficiency level over a wider output current range than can be achieved with fixed-frequency control signals. This control can be applied to switching regulators using peak current mode, average current mode, or voltage mode control, as well as buck, buck-boost, and boost power stages.

The prior art DC-DC converter has a limited control range when the duty ratio is small.

It is an object of the invention to provide a DC-DC converter which is able to cope with larger dynamic load variations. The invention is defined by the independent claims. Advantageous embodiments are defined in the dependent claims.

The DC-DC converter in accordance with the invention comprises a switch for periodically connecting an inductor to a DC-input voltage during an on-period of a period time. The operating frequency of the DC-DC converter is the inverse of the period time. The DC-DC converter further has an output which is coupled to the inductor and at which the output voltage is present. The current through the inductor increases during the on-period to store energy in the inductor. During the off-period, energy is supplied by the inductor to the load and the current in the inductor decreases.

A controller controls the operating frequency to be substantially proportional to the output voltage to obtain a substantially constant average duration of the on-period as function of the output voltage. The average duration of the on-period will be selected to be large enough to allow the on-time to become smaller during a short period in time when the load requires less current and the frequency of the converter is not instantly controlled to cope with the lower current. If in the prior art the duty cycle (and thus the on-time) is controlled to become smaller (it is disclosed that the duty cycle may become zero) the duty becomes too small to cope with dynamic load variations.

The operating frequency need not be exactly proportional to the output voltage as it is not required that the average value of the on-period has exactly a predetermined duration. It suffices that the output voltage is substantially proportional such that the average value of the on-period is substantially constant.

In the DC-DC converter in accordance with the invention, the duration of the on-period is substantially independent on the output voltage and thus can be selected large enough to cope with dynamic load variations at the output.

Further, in the prior art mentioned, it is not the output voltage which is directly controlling the operating frequency of the DC-DC converter, but the difference of the output voltage and a reference voltage.

In an embodiment as defined in claim 2, the DC-DC converter comprises a controllable oscillator which supplies a control signal to a drive circuit. The drive circuit supplies a drive signal to the switch to control on- and off-states of the switch.

An output voltage measurement circuit supplies an oscillator control signal to the controllable oscillator to adapt its operating frequency to be substantially proportional to the output voltage while keeping the on-period of the switch substantially constant. Such a drive circuit, controllable oscillator, and output voltage measurement are generally known. Their implementation is not relevant to the invention. But, the transfer characteristic should be selected such that the operating frequency depends in the desired manner from the output voltage. The output measurement circuit may supply the output voltage as the oscillator control signal.

In an embodiment as defined in claim 3, the operating frequency is substantially directly proportional to the output voltage. This is a simple approach, the operating frequency changes substantially linear with the output voltage: $fo=k1 \times Vo$, wherein fo is the operating frequency, k1 is a constant, and Vo is the output voltage.

In an embodiment as defined in claim 4, the operating frequency is further dependent on the DC-input voltage to keep the duration of the on-period substantially constant at a varying input voltage.

In an embodiment as defined in claim 5, the operating frequency is substantially directly proportional to the inverse of the DC-input voltage.

In an embodiment as defined in claim 6, the dependency of the operating frequency on the output voltage and the DC-input voltage is according the following equation $$fo=(N \times Vo)/(Ton \times Vi)$$

wherein N is a constant, Vo is the output voltage, Ton is the substantially constant on-period, and Vi is the DC-input voltage. This dependency is especially relevant in a buck converter wherein the duty cycle in the steady state is determined by the following equation $$d=Ton/Tp=Vo/Vi$$

wherein Tp is the duration of one period containing one on-period Ton and one off-period Toff, and thus is the inverse of the operating frequency fo.

In an embodiment as defined in claim 8, the controller comprises a comparator which compares an actual duration of the on-period of the switch with a desired duration of the on-period to control the operating frequency to obtain a substantially constant average duration of the on-period. Only the desired average on-time needs to be set, it is not required to measure the value of the DC-input voltage and the value of the output voltage. It is further an advantage that tolerances in the controller will be negotiated by the closed loop. Preferably, the controller further comprises a loop filter which low pass filters the difference between the actual duration of the on-period and the desired duration of the on-period and which supplies the filtered difference to the controllable oscillator. Preferably, an integration time of the filter is substantially longer than the duration of one period to obtain a slow loop to prevent instabilities. The loop need not be very fast because it only has to control the operating frequency such that the duration of the on-period is in average constant. Dynamic variation of the duration of the on-time with dynamic load steps is allowable.

In an embodiment as defined in claim 9, on top of the presence of the loop, also the value of the DC-input voltage and the value of the output voltage is measured to obtain a fast reaction on variations on these voltages.

These and other aspects of the invention are apparent from and will be elucidated with reference to the embodiments described hereinafter.

Figure 2:
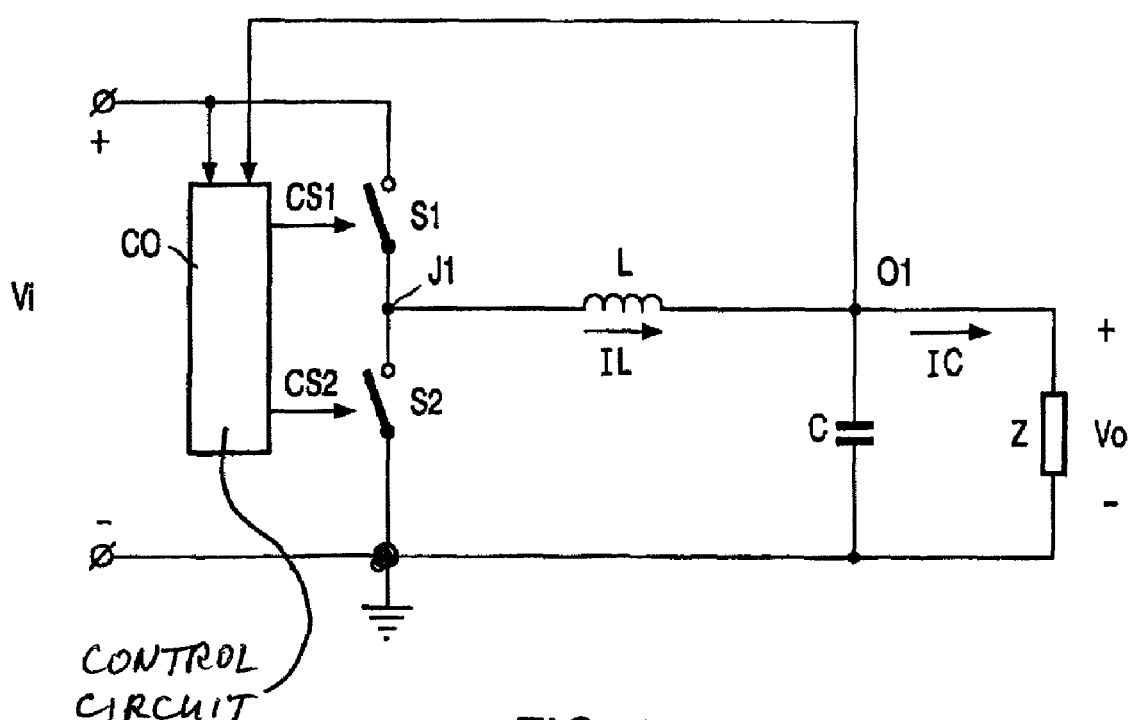
Figure 5:
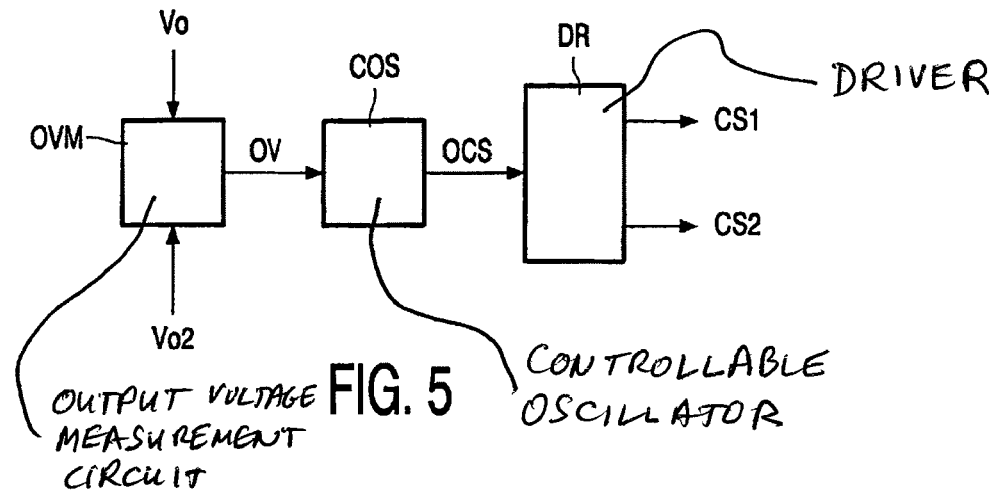
Figure 6:
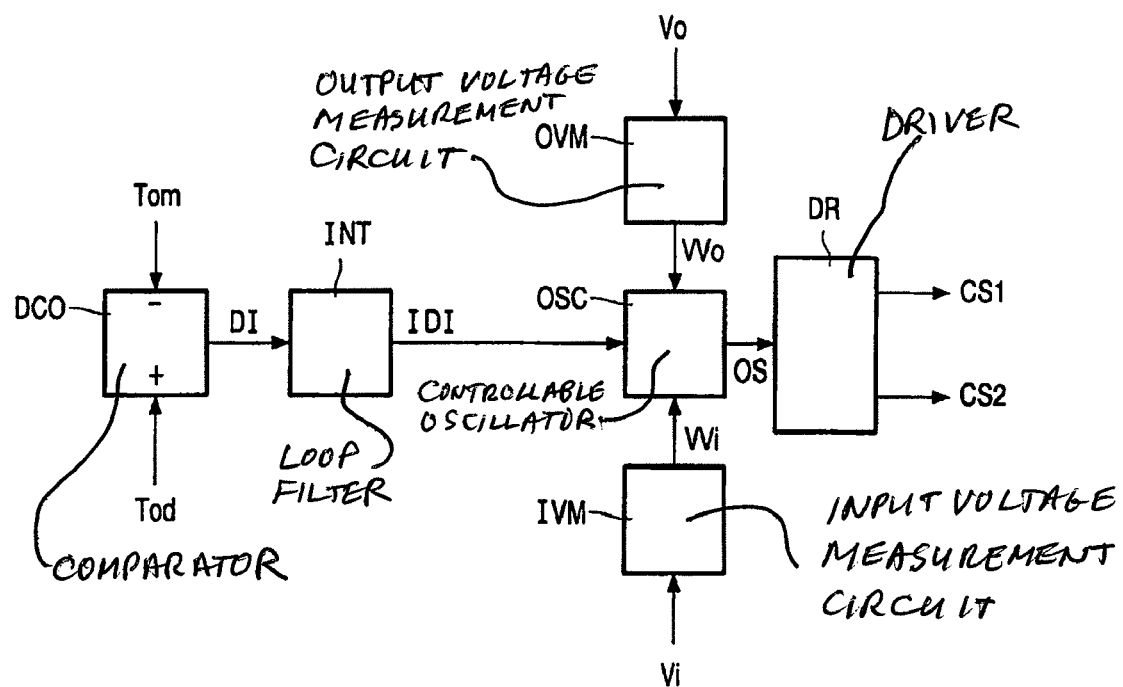

In the drawings:

FIG. 1 shows a block diagram of an embodiment of a DC-DC converter in accordance with the invention, FIG. 2 shows a block diagram of a buck converter in accordance with the invention, FIG. 3 show signals for elucidating the operation of the buck converter of FIG. 2, FIG. 4 shows the operating frequency as a function of the output voltage, FIG. 5 shows an embodiment of a control circuit for controlling the buck converter of FIG. 2, and FIG. 6 shows another embodiment of a control circuit for controlling the buck converter of FIG. 2.

The same references in different Figures refer to the same signals or to the same elements performing the same function.

FIG. 1 shows a block diagram of an embodiment of a DC-DC converter in accordance with the invention. The DC-DC converter comprises a series arrangement of an inductor L and a controllable switch S1. The series arrangement receives a DC-input voltage Vi. The negative pole of the DC-input voltage Vi is connected to ground. A diode D is arranged between an output O1 and the junction of the inductor L and the switch S1. Both a smoothing capacitor C and a load Z are arranged between the output O1 and ground. The output voltage Vo of the DC-DC converter is present across the load Z. A control circuit CO receives the output voltage Vo and supplies a control signal CS to the switch S1 to control the on- and off-periods Ton, Toff of the switch S1.

The controller CO controls the operating frequency of the DC-DC converter as a function of the output voltage Vo such that the on-period Ton is kept substantially constant. Embodiments of the controller CO are elucidated with respect to FIGS. 5 and 6.

The DC-DC converter shown may be build in an electronic apparatus such as for example, a television receiver, a computer monitor, a video cassette recorder, a printer, or a computer. The load Z is a circuit of this electronic apparatus.

In an embodiment in accordance with the invention, the controller CO receives the input voltage Vi to further control the operating frequency fo as a function of the input voltage Vi such that the on-period Ton is kept substantially constant.

FIG. 2 shows a block diagram of a buck converter in accordance with the invention. The buck converter comprises a series arrangement of main current paths of a switch S1 and a switch S2 arranged to receive the DC-input voltage Vi. An inductor L1 is arranged between the output O1 of the DC-DC converter and the junction of the main current paths of the switches S1 and S2. The negative pole of the DC-input voltage and the terminal of the switch S2 not connected to the switch S1 are grounded. A parallel arrangement of a smoothing capacitor C and a load Z is arranged between the output O1 and the ground.

The control circuit CO receives the output voltage Vo, and optionally the input voltage Vi to supply the control signals CS1 and CS2 which control the on- and off-periods of the switches S1 and S2, respectively. The switches S1 and S2 are controlled to have substantially opposite phases: when the switch S1 is conductive (closed) the switch S2 is non-conductive (open), and the other way around.

Again, the controller CO controls the operating frequency fo of the DC-DC converter as a function of the output voltage Vo such that the on-period Ton of the switch S1 is kept substantially constant. Embodiments of the controller CO are elucidated with respect to FIGS. 5 and 6. In an embodiment in accordance with the invention, the controller CO receives the input voltage Vi to further control the operating frequency fo as a function of the input voltage Vi such that the on-period Ton is kept substantially constant as a function of the input voltage Vi also. The output current IO is the current required by the load Z.

Again, the buck converter may be build in an electronic apparatus such as for example, a television receiver, a computer monitor, a video cassette recorder, a printer, or a computer. The load Z is a circuit of this electronic apparatus. The buck converter may be particular advantageously used to regulate the supply voltage of a microprocessor. In today's computers, the microprocessor requires very high currents at a power supply voltage of approximately 1.5 Volts. Usually, the converter has a DC-input voltage of about 12 Volts. The current demanded by the microprocessor varies to a very large amount while the power supply voltage should be well defined.

FIG. 3 show signals for elucidating the operation of the buck converter of FIG. 2. FIG. 3A shows the control signal CS1, FIG. 3B shows the control signal CS2, and FIG. 3C shows the current IL through the inductor L.

At instant t1, which is the start of the on-period Ton of the switch S1, the switch S2 is opened and the switch S1 is closed, the inductor L is connected to the positive pole of the DC-input voltage Vi which has higher value than the output voltage Vo, and thus the current IL will start to increase. If both the DC-input voltage Vi and the output voltage Vo are substantially constant, the current IL will increase substantially linearly.

At instant t2, which is the end of the on-period Ton of the switch S1, the switch S1 is opened and the switch S2 is closed. Now, the voltage over the inductor L changes polarity and the current IL starts to decrease. If the output voltage Vo is considered to be substantially constant, the current IL through the inductor L will decrease substantially linearly. At instant t3 a next on-period Ton of the switch S1 starts. The off-period of the switch S1 lasts from instant t2 to instant t3. The duration of one period Tp of a switching cycle is referred to as the period duration Tp. The operating frequency fo of the buck converter is the inverse of the period duration Tp.

If the amount of energy required by the load Z decreases, the output voltage Vo starts rising because energy will be stored in the smoothing capacitor C. The controller CO controls the average operating frequency fo of the buck converter such that the average on-time Ton of the switch S1 is kept constant.

In a buck converter, the operating frequency fo depends on the value of the DC-input voltage Vi and the output voltage Vo in accordance with the following equation $$fo=(N\times Vo)/(Ton\times Vi)$$

wherein Ton is the substantially constant on-time, and N is the number of buck converters if multiple buck converters are arranged in parallel to minimize the ripple on the output voltage Vo.

Thus, based on this equation, the controller CO adapts the operating frequency fo with the value of the output voltage Vo and the value of the DC-input voltage Vi while the value of the on-period Ton is kept fixed.

FIG. 4 shows the operating frequency as a function of the output voltage.

The operating frequency fo of the buck converter is depicted along the vertical axis and the output voltage Vo is depicted along the horizontal axis.

In FIG. 4, by way of example, two graphs fl1 and fl2 are shown of the operating frequency fo as function of the output voltage Vo. For the ease of explanation, it is assumed that the DC-input voltage Vi does not vary.

In practical applications, often the DC-input voltage Vi is fixed but may have different discrete values of, for example, 12 Volts or 5 Volts. In this case it is not necessary to measure the value of the DC-input voltage Vi accurately, and it can be treated as a constant for which different values can be selected according to the actual value of the DC-input voltage Vi.

The graph fl1 shows that the operating frequency fo decreases linearly with decreasing output voltage Vo. Below a particular value Vo2 of the output voltage Vo, the operating frequency should be limited to a particular minimum value fmin to guarantee start-up of the converter. It is also possible to select a frequency offset FO on the operating frequency fo such that fmin is reached at the minimum value Vo1 of the output voltage Vo, as is indicated by the line fl2. The minimum frequency fmin or the offset FO is selected according to the desired minimum duration of the on-time Ton (the maximum value of this minimum frequency fmin) and an acceptable maximum peak current (the minimum value of this minimum frequency) leading to a maximum on-time Ton.

FIG. 2 shows the principal diagram of buck converter wherein the switch S1 is usually a FET called control-FET or control switch and the synchronous switch S2 is usually a FET called sync-FET or sync switch. Usually, the current through the switch S1 is sensed with a sense-resistor (not shown) which usually is arranged between the positive pole of the DC-input voltage Vi and the switch S1. With the buck converter operating with (direct) current mode control, a minimum on-time Ton is necessary to be able to measure the current in the inductor L during the on-time Ton of the switch S1. Parasitic capacitances or delays will disturb the sense signal considerably if the on-time Ton of the switch S1 becomes very short.

A buck converter as such is disclosed in U.S. Pat. No. 4,524,412. In a buck converter the duty cycle of the switching node is a function of output voltage Vo and input voltage Vi. When a large ratio between the supply voltage Vi and the output voltage Vo is applied in a buck converter very small on-times Ton of the control switch S1 can occur. If current mode control is applied the measured inductor current IL at the end of the control switch S1 on-time Ton can therefore be disturbed by parasitic components or not settled in time.

According to the basic equation of a buck converter, the duty cycle d in the steady state is a function of the DC-input voltage Vi and the output voltage Vo:

$$d=Ton/Tp=Vo/Vi$$

wherein Tp is the period duration and 1/Tp is the operating frequency fo.

If a multitude of buck converters is arranged in parallel to minimize the ripple on the output voltage Vo, the buck converters are controlled to be active sequentially each one during its own phase. For example, with respect to FIG. 3, if two buck converters are used in parallel, in one period Tp, the first buck converter starts an on-phase at the instant t1 as shown, another one of the buck converters starts an on-phase at instant t5. This dual buck converter system has two phases, one for each buck converter. In such a system of a multitude of buck converters, d is the duty cycle at the switching node of a phase (one of the buck converters), and Tp is the period time of the signal at the switching node of each phase.

In case of a low output voltage Vo, for example during start-up of the converter, or over-current protection, problems can occur if the on-time Ton cannot be lowered: the converter will not be regulated anymore.

If Ton cannot become lower than a minimum on-time Tmin, at a particular output voltage Vo and input voltage Vi, in a buck converter, the operating frequency fo has to be lowered to keep the buck converter regulated.

As the current ripple Ir in the steady state is equal to the delta of the current IL through the inductor L during the on-period of the switch S1, this ripple can be calculated as:

$$Ir=(Vi-Vo)\times(Ton/L).$$

Thus, at a longer period time Tp than necessary, the system operates with a longer on-time Ton of the switch S1 than necessary and thus the current ripple Ir will be larger than necessary. Therefore, an optimum choice for the current ripple Ir, is to select the on-time Ton as short as possible. The minimum period time Tp then must be:

$$Tp=Ton\times(Vi/Vo)$$

An existing method of adapting the period time Tp, as disclosed in U.S. Pat. No. 4,524,412, is to measure the current during the on-time of the switch S2 and to prevent the switch S1 to switch on until the current in the switch S2 has decreased below a particular maximum value. This prior art has the drawback that it is necessary to measure the current during the on-time of the switch S2.

In the present application, a method is described to keep the on-time Ton of the control switch S1 rather constant over the whole output voltage- and input voltage range. With the proposed solution, the output voltage range can be made larger, and smaller inductors L and output capacitors C can be chosen, without the need of current sensing during the sync switch S2 stroke. The output capacitors C can be selected as small as possible because the ripple current Ir in the inductor L is minimized. Advantageously, frequency adaptation is a function of the input voltage Vi and output voltage Vo. The output voltage Vo of the buck converter can be adapted over a very wide range without significant change in the ripple current Ir and with almost constant on-time Ton of the control FET S1. Constant on-time of the control FET S1 is an advantage because larger on-time variations caused by dynamic load variations are possible.

In a practical buck converter, a fixed frequency is used for normal operation from no load to a particular value of the output current Io supplied to the load Z. The period time Tp is selected such that the on-time Ton is larger than Tmin so that during load-steps the on-time Ton can still be lowered to keep the converter regulated. Below a predetermined value of the output voltage Vo, the operating frequency fo will be lowered according to the equation valid for the buck converter. This means that the operating frequency fo will be proportional to the output voltage Vo and the conversion factor can be defined or kept fixed with the combination of the number of phases N and the DC-input voltage Vi. The current mode loop operates as usual and will keep the on-time Ton almost constant as it tries to keep the peak-current Ir constant.

It is also possible to adapt the frequency fo over the whole range of the output voltage Vo. This is even simpler because it is not required to detect whether the output voltage Vo drops below the predetermined value.

It is also possible to define a desired on-time Ton that is a factor times the minimum on-time Tmin. This factor can be fixed or externally tuned. During operation, the desired on-time Tod (see FIG. 6) is compared with the actual on-time Tom and with a slow loop the on-time is adapted to become equal to the desired on-time Tod. As a result, the operating frequency fo is automatically adapted to the maximum value possible at the given desired on-time Tod. The advantage of this solution is that the operating frequency fo will always be the maximum possible frequency under all circumstances, and that it is not necessary to measure the DC-input voltage Vin accurately. If 5 Volts or 12 Volts operation is desired, only two fixed values for the DC-input voltage Vin are sufficient because of the automatic adaptation. Also the number of phases N can be programmed in the conversion factor of the oscillator OSC.

FIG. 5 shows an embodiment of a control circuit for controlling the buck converter of FIG. 2. The control circuit CO comprises an output voltage measurement circuit OVM, a controllable oscillator COS, and a driver DR.

The output voltage measurement circuit OVM has an input to receive the output voltage Vo, an input to receive the predetermined value Vo2 (see FIG. 4, the line fl1) of the output voltage Vo at which the control mode changes, and an output to supply the oscillator control signal OV. The output voltage measurement circuit OVM may comprise a comparing circuit (not shown) which compares the output voltage Vo with the predetermined value Vo2 to supply the oscillator control signal OV which is the minimum of the output voltage Vo or the predetermined value Vo2. The output measurement circuit OVM may also directly supply the output voltage Vo as the oscillator control signal OV.

The controllable oscillator COS receives the oscillator control signal OV to supply the control signal OCS to the drive circuit DR. The controllable oscillator may be a known voltage to frequency converter. The control signal OCS will have a repetition frequency which is proportional to the level of the oscillator control signal OV:

$$fosc = a \times OV$$

wherein fosc is the repetition frequency of the control signal OCS, a is a constant factor, and OV is the level of the oscillator control signal OV.

The driver DR receives the control signal OCS and supplies the drive signal CS1 to control the on- and off periods of the switch S1, and the drive signal CS2 to control the on- and off periods of the switch S2. The period time Tp which contains one on- and off period Ton, Toff is the inverse of the repetition frequency fosc of the control signal OCS. For example, in a practical implementation, the control signal OCS may be a pulse signal with a rising edge which indicates the start of the on-period Ton of the switch S1. The substantially fixed on-time Ton may already be provided in the control signal OCS, or may be counted in the driver DR. The on-time Ton of the switch S1 may be counted by a counter (not shown) which counts clock pulses of a clock generator in a known manner. The drive signal CS2 is in principle the inverse of the drive signal CS1. As know, care has to be taken that the switches S1 and S2 do not conduct at the same time.

Below the predetermined value Vo2, the buck converter operates at a fixed operating frequency fmin as the oscillator signal OV is the predetermined value Vo2, above the predetermined value Vo2, the converter operates in the constant on-time Ton mode wherein the operating frequency fo is proportional to the value of the output voltage Vo.

FIG. 6 shows another embodiment of a control circuit for controlling the buck converter of FIG. 2. The controller CO comprises a comparator DCO, a loop filter INT, a controllable oscillator OSC, a drive circuit DR, an output voltage measurement circuit OVM, and an input voltage measurement circuit IVM. Usually, the loop filter INT is a low pass filter and comprises an integrator.

The comparator DCO compares the measured actual on-period Tom with a desired on-period Tod and supplies a difference signal DI.

The loop filter INT filters the difference signal DI to obtain the filtered difference signal IDI. Preferably, an integrating period of the filter INT is much longer than the period time Tp.

The output voltage measurement circuit OVM receives the output voltage Vo and measures the value Wo of the output voltage Vo. The output voltage measurement circuit OVM may transfer the output voltage Vo to its output such that the value VVo is the output voltage Vo. In the last case, the output voltage measurement circuit OVM is superfluous.

The input voltage measurement circuit IVM receives the input voltage Vi and measures the value VVi of the input voltage Vi. The input voltage measurement circuit IVM may transfer the input voltage Vi to its output such that the value Wi is the input voltage Vi. In the last case, the input voltage measurement circuit IVM is superfluous.

The measurement of the values VVo and VVi of the output voltage Vo and the input voltage Vi, respectively may be relevant if the oscillator OSC is controlled by a digital circuit which calculates the required operation frequency fo from the digital values of the output voltage Vo and the input voltage Vi. The oscillator OSC may also be controlled by an analog circuit.

The oscillator OSC which receives the filtered difference signal IDI and the values VVo and VVi will supply an oscillator signal OS with a repetition frequency equal to the operation frequency fo in accordance with the equation:

$$fo = (kc \times Vo)/(Tod \times Vi)$$

wherein the value of kc depends on the filtered difference signal IDI.

Alternatively, only the desired on-time Tod needs to be set, it is not required to measure both the value of the DC-input voltage Vi and the value of the output voltage Vo. The closed loop obtained by the comparator DCO and the loop filter INT controls the operating frequency fo to obtain a substantially constant average duration of the on-period Ton which is equal to the desired on-period Tod.

The closed loop has the advantage that tolerances in the controller CO will be negotiated by the closed loop.

It should be noted that the above-mentioned embodiments illustrate rather than limit the invention, and that those skilled in the art will be able to design many alternative embodiments without departing from the scope of the appended claims.

For example, the inductor L which is shown to be a coil may be a transformer. A transformer is particular relevant if several different output voltage have to be generated, or when the primary side and the secondary side of the DC-DC converter must be galvanic separated.

The controlled switches are preferably semiconductor devices, such as MOSFETs or bipolar transistors.

This control in accordance with the invention can be applied to switching regulators using peak current mode, average current mode, or voltage mode control, as well as buck, buck-boost, and boost power stages.

In the claims, any reference signs placed between parentheses shall not be construed as limiting the claim. The word "comprising" does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A DC-DC converter comprising:
   an inductor coupled for receiving a DC-input voltage and for supplying an output voltage,
   a switch for periodically connecting the inductor to the DC-input voltage during an on-period of a period time, and for directly connecting the inductor to ground, an operating frequency of the DC-DC converter being the inverse of the period time, and
   a controller for controlling the operating frequency to be substantially proportional to the output voltage to obtain a substantially constant average duration of the on-period as function of the output voltage.

2. A DC-DC converter as claimed in claim 1, wherein the controller comprises:
   a drive circuit for supplying a drive signal to the switch to control on- and off-states of the switch,
   a controllable oscillator for supplying a control signal to the drive circuit, and
   an output voltage measurement circuit for supplying an oscillator control signal for controlling the controllable oscillator to adapt its operating frequency to be substantially proportional to the output voltage while keeping the average duration of the on-period of the switch substantially constant.

3. A DC-DC converter as claimed in claim 1, wherein the operating frequency is substantially directly proportional to the output voltage.

4. A DC-DC converter as claimed in claim 1, wherein the operating frequency is further dependent on the DC-input voltage to obtain the substantially constant average duration of the on-period as function of the DC-input voltage, also.

5. A DC-DC converter as claimed in claim 4, wherein the operating frequency is substantially directly inverse proportional to the DC-input voltage.

6. A DC-DC converter as claimed in claim 5, wherein the operating frequency fo is $fo=(N \times Vo)/(Ton \times Vi)$, wherein N is a constant, Vo is the output voltage, Ton is the substantially constant average duration of the on-period, and Vi is the DC-input voltage.

7. A DC-DC converter as claimed in claim 1, wherein the controller comprises a comparator for comparing an actual duration of the on-period of the switch with a desired duration of the on-period to control the operating frequency to obtain the substantially constant average duration of the on-period.

8. A DC-DC converter as claimed in claim 7, wherein the controller further comprises:
   a loop filter for filtering a difference signal supplied by the comparator to obtain a filtered difference signal,
   a controllable oscillator for receiving the DC-input voltage, the output voltage, and the filtered difference signal to supply an oscillator signal having the operating frequency and the substantially constant average duration of the on-period, and
   a drive circuit for receiving the oscillator signal to drive the switch.

9. A DC-DC converter as claimed in claim 7, wherein the controller further comprises:
   an input voltage measurement circuit for measuring a value of the DC-input voltage,
   an output voltage measurement circuit for measuring a value of the output voltage,
   a loop filter for filtering a difference signal supplied by the comparator to obtain an filtered difference signal,
   a controllable oscillator for receiving the value of the DC-input voltage, the value of the output voltage, and the filtered difference signal to supply an oscillator signal having the operating frequency and the substantially constant average duration of the on-period, and
   a drive circuit for receiving the oscillator signal to drive the switch.

10. A DC-DC converter as claimed in claim 7, wherein the operating frequency fo is $fo=(N \times Vo)/(Ton \times Vi)$, wherein Vo is the output voltage, Ton is the substantially constant average duration of the on-period, Vi is the DC-input voltage, and wherein N depends on the filtered difference signal.

11. A DC-DC converter as claimed in claim 1, wherein a series arrangement of main current paths of the first mentioned switch and a further switch is arranged for receiving the DC-input voltage, the inductor being arranged between a smoothing capacitor and a junction of the main current paths of the first mentioned switch and the further switch, the output voltage being present across the smoothing capacitor, the control circuit being adapted to further control the further switch in substantially the opposite phase than the first mentioned switch.

12. A controller for use in the DC-DC converter as claimed in any one of the preceding claims.

13. An apparatus comprising a DC-DC converter as claimed in any one of the claims 1 to 11.

14. A method of controlling a DC-DC converter comprising:
   an inductor coupled for receiving a DC-input voltage and for supplying an output voltage,
   a switch for periodically connecting the inductor to the DC-input voltage during an on-period of a period time, and for directly connecting the inductor to ground, an operating frequency of the DC-DC converter being the inverse of the period time,
   the method comprising the step of controlling the operating frequency to be substantially proportional to the output voltage to obtain a substantially constant average duration of the on-period as function of the output voltage.

* * * * *